Sept. 27, 1949. H. L. GOODWIN ET AL 2,482,906
ROCKER PANEL ASSEMBLY FOR AUTOMOBILE BODIES
Filed Aug. 2, 1946 2 Sheets-Sheet 1
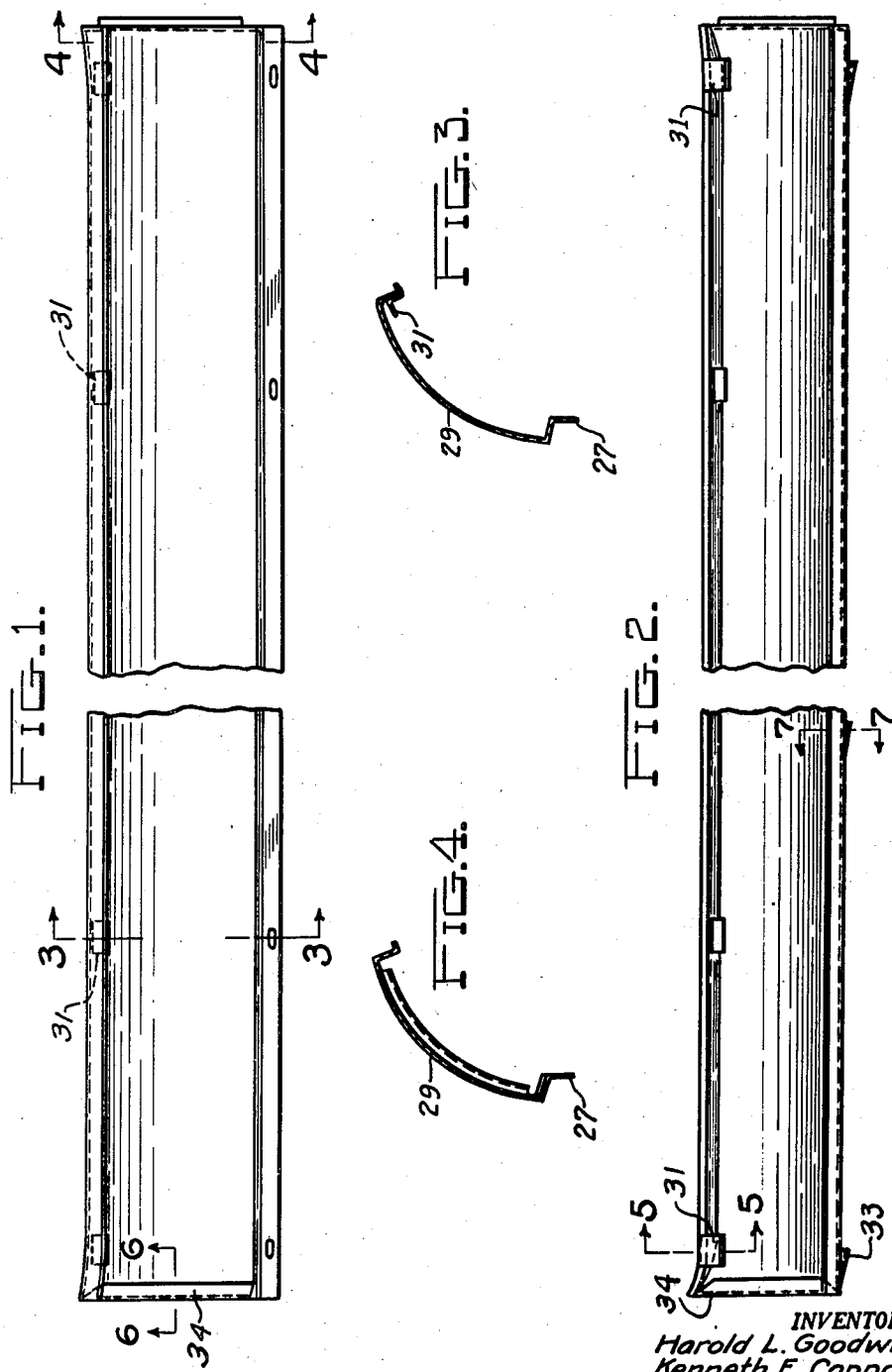
INVENTOR.
Harold L. Goodwin
Kenneth E. Coppock
BY
ATTORNEYS.

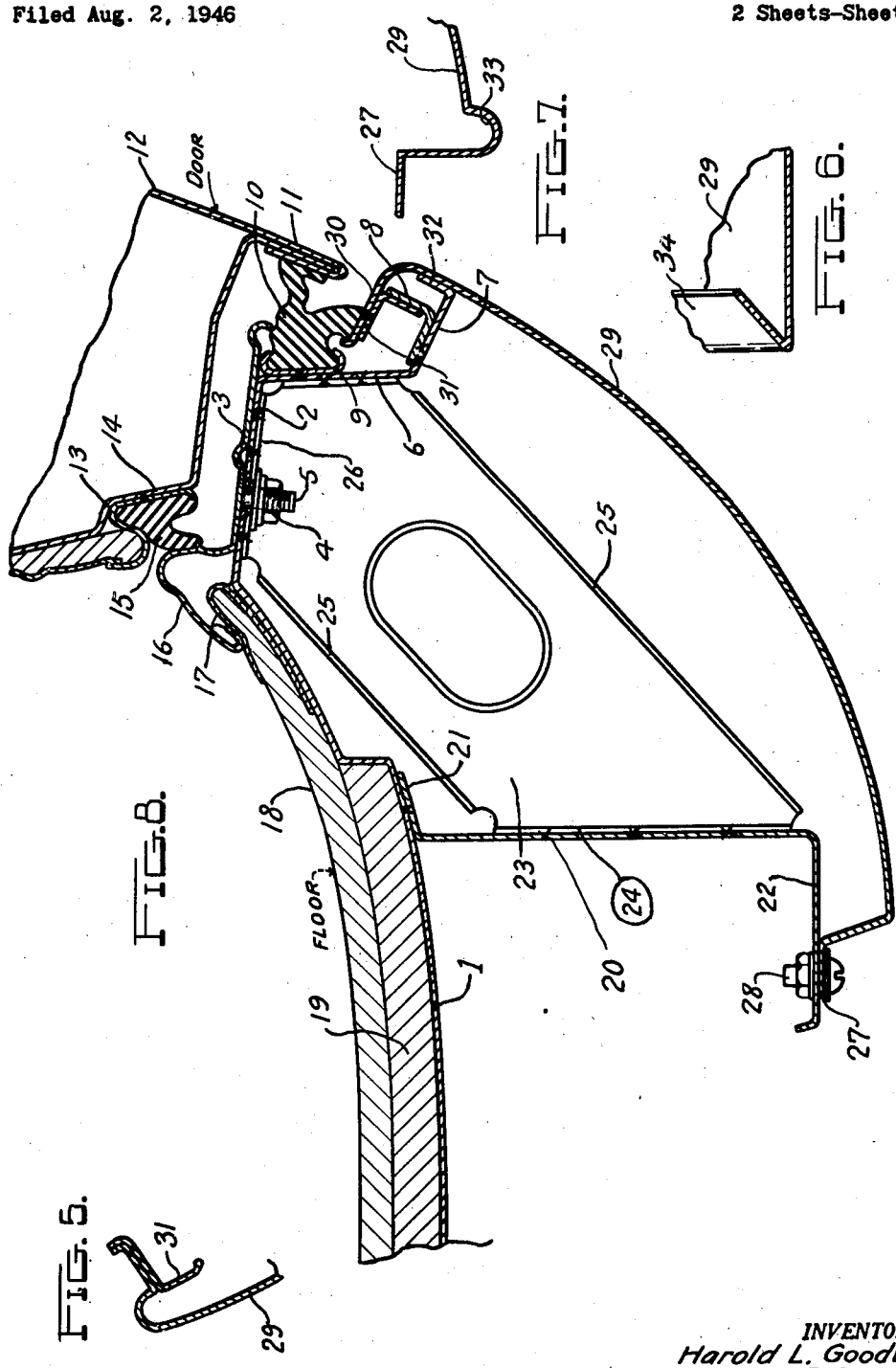

Patented Sept. 27, 1949

2,482,906

UNITED STATES PATENT OFFICE 2,482,906

ROCKER PANEL ASSEMBLY FOR AUTOMOBILE BODIES

Harold L. Goodwin, Detroit, and Kenneth E. Coppock, Pleasant Ridge, Mich., assignors to General Motors Corporation, Detroit, Mich., a corporation of Delaware Application August 2, 1946, Serial No. 687,822

7 Claims. (Cl. 296—28)

This invention relates to rocker panels for use on automobile bodies. A rocker panel is the strip on the outside of the sill.

It is the object of the present invention to provide a sill and rocker panel construction for all-metal bodies which involves an assembly that will provide the requisite strength and at the same time will afford a rocker panel which may easily be put in place and which can be conveniently removed if the rocker panel needs refurbishing or repairing. It further receives stones and other objects thrown up from the road or wheels and acts to protect the other nearby panels from chipping and abrasion. If made of stainless steel it is corrosion-resisting.

Referring to the drawings:

Fig. 1 is an inside elevation of the rocker panel turned up 45° from the position it will occupy when in place.

Fig. 2 is an inside elevational view of the same rocker panel viewed in the position it will take when in place.

Fig. 3 is a section on the line 3—3 of Fig. 1.

Fig. 4 is a section on the line 4—4 of Fig. 1.

Fig. 5 is a section on the line 5—5 of Fig. 2.

Fig. 6 is a section on the line 6—6 of Fig. 1.

Fig. 7 is a section on the line 7—7 of Fig. 2.

Fig. 8 is a cross section through a part of the floor pan and the sill which includes the outer and inner rocker panels and the threshold strip.

The construction shown in the drawings happens to be a combined chassis frame and body construction. The frame members on which the body is built are not shown in the drawings. These will be located to the left of the structure shown in Fig. 8. The structure shown in Fig. 8 comprises a floor pan 1 which is a sheet metal stamping that extends from the frame members (not shown) out to the side of the body. It has a portion 2 that forms the door opening and is adapted to lie under the threshold strip 3 which is bolted thereto by the bolt and nut assembly 4. The bolt 5 is spot welded to the threshold strip which may be stainless steel. The outer portion of the floor pan is provided with a drop portion 6 which ends in a channel 7 to which are spot welded the clips 8. A weatherstrip retaining channel 9 is spot welded to the drop portion of the floor pan and this carries a weatherstrip 10 which is adapted to abut the overlap flange 11 of door 12. Another weatherstrip retaining channel 13 is spot welded to the inside and bottom of the inner panel 14 of the door. This retaining channel carries the weatherstrip 15 which abuts the threshold bead 16. The threshold bead is looped over on the inside to form retainer 17 for the carpet 18 which is supported on the carpet pad 19 that is contained in the dip of the floor pan.

20 is the inner rocker panel which has an outwardly-turned upper flange 21 which is spot welded to the floor pan 1. This panel has an inwardly-turned lower flange 22. At spaced points along the inner rocker panel the braces 23 are spot welded to the inner panel through the turned-over flanges 24. These inclined braces 23 have turned-over side flanges 25 which make the braces channel shape in cross section and thereby strengthens them. At the top of the brace is a turned-forward flange 26 which is spot welded to the underside of the floor pan.

The rocker panel itself is shown in Figs. 1 to 4, inclusive, and is made of stainless steel. The rocker panel, as viewed in Fig. 1, is turned up 90° from the rocker panel viewed in Fig. 8. The comparison between Figs. 1 and 8 is a little confusing for the reason that the rocker panel shown in Figs. 1 to 4, inclusive, is a right-hand rocker panel and the rocker panel shown in Fig. 8 is a left-hand rocker panel, but one can get orientated by considering the sections 3 and 4 as being turned clockwise 90° from the position they occupy when assembled. The flange 27 is the lower flange which, in Fig. 8, will be seen bolted to the inturned lower flange 22 of the inner rocker panel by bolt and nuts 28. The body of the rocker panel is given a long sweeping curve from top to bottom, which is designated 29. This will be the portion that is exposed to view at the side of the body. The upper turned-in flange 30 of the rocker panel has welded to the underside clips 31 which are adapted to slip behind the clips 8 on the outer edges of the floor pan. The turned-up edge 32 of the floor pan is adapted to act as a stop or locator for the application of the outer rocker panel 29. The clips 31 on the outer rocker panel are nicely located thereon so that when they slip behind the clips 8 on the floor pan there is a slight stress or tension put on the upper part of the rocker panel in slipping the clips one behind the other. These clips of the rocker panel hook in place behind the clips of the floor pan and the turned-up edge of the floor which acts as a locator or stop for the rocker panel so the top of the rocker panel removably locks into the floor pan by reason of the proper placement of the clips to give the necessary stress. Then the bottom of the rocker panel is bolted to the turned-in flange 22 of the inner rocker panel.

Struck-out and sheared dents 33 are provided in the bottom of the rocker panel. These provide vents and drain openings. The ends of the rocker panel are turned over in acutely angular flanges 34 (see Fig. 6).

What I claim is:

1. A sill and rocker panel assembly for metal bodies, having in combination with a metal floor pan, an inner rocker panel secured to the underside of the floor pan, an outer rocker panel arranged to have an easily engageable hook engagement with the outer edge portion of the floor pan and removably bolted along its under edge to the inner rocker panel, and inclined braces having one end welded to the outside of the inner rocker panel and the other upper end welded to the underside of the floor pan, said braces being independent of the outer rocker panel.

2. A sill and rocker panel assembly for metal bodies, having in combination with a metal floor pan having an outer turned up edge portion, an inner rocker panel secured to the under side of the floor pan and an outer rocker panel arranged to have a hook engagement with the outer edge portion of the floor pan and removably securable along its under edge to the inner rocker panel, the said hook engagement between the outer rocker panel and the floor pan including an upstanding clip on the floor pan and a depending clip on the outer rocker panel to engage behind the clip secured to the floor pan, the clips being spaced from the main wall of the outer rocker panel and the outer edge of the floor pan so that they are engaged under stress.

3. A sill and rocker panel assembly for metal bodies, having in combination with a metal floor pan, an inner rocker panel secured to the under side of the floor pan and an outer rocker panel arranged to have a hook engagement with the outer edge portion of the floor pan and removably securable along its under edge to the inner rocker panel, the said hook engagement between the outer rocker panel and the floor pan including an upstanding clip on the floor pan and a depending clip on the outer rocker panel to engage behind the clip secured to the floor pan under stress, the floor pan provided at its outer edge with a turned-up portion forming a stop against which the body of the outer rocker panel engages when the clips are hooked together, the location of the clips with respect to each other and the stop arranged to put the metal under stress to hold the clips together.

4. A sill and rocker panel assembly for metal bodies, having in combination with a metal floor pan, an inner rocker panel secured to the under side of the floor pan, an outer rocker panel arranged to have an easily engageable hook engagement with the outer edge portion of the floor pan and removably bolted along its under edge to the inner rocker panel, and inclined braces having at their ends turned-over flanges, one of which is spot welded to the inside of the inner rocker panel and the other of which is spot welded to the underside of the floor pan, said braces being independent of the outer rocker panel.

5. A sill and rocker panel assembly for metal bodies, having in combination with a metal floor pan, an inner rocker panel secured to the under side of the floor pan and an outer rocker panel arranged to have a hook engagement with the outer edge portion of the floor pan and removably securable along its under edge to the inner rocker panel, the said floor pan having an upwardly-extending portion at the side edges to form the door sill and having on the outside of the door sill a drop portion which ends at the side with a channel, the outer edge portion of the floor pan being turned up to form a stop member to abut the removable rocker panel, upstanding angular clips welded to the floor pan in the channel and the rocker panel having a turned-in flange at the top having angular depending clips welded to said turned-in flange, the said clips of floor pan and rocker panel arranged to engage one behind the other under stress when the rocker panel is applied to the floor pan and abuts against the turned-up outer edge of the floor pan, the said rocker panel having a flange at its lower edge which is removably bolted to the turned-in flange of the inner rocker panel.

6. A sill and rocker panel assembly for metal bodies, having in combination with a metal floor pan, an inner rocker panel secured to the under side of the floor pan, an outer rocker panel arranged to have a hook engagement with the outer edge portion of the floor pan and removably securable along its under edge to the inner rocker panel, the said floor pan having an upwardly-extending portion at the side edges to form the door sill and having on the outside of the door sill a drop portion which ends at the side with a channel, the outer edge portion of the floor pan being turned up to form a stop member to abut the removable rocker panel, upstanding angular clips welded to the floor pan in the channel, the rocker panel having a turned-in flange at the top having angular depending clips welded to said turned-in flange, the said clips of floor pan and rocker panel arranged to engage one behind the other under stress when the rocker panel is applied to the floor pan and abuts against the turned-up outer edge of the floor pan, the said rocker panel having a flange at its lower edge which is removably bolted to the turned-in flange of the inner rocker panel, and inclined braces spot welded at one end to the inside of the inner rocker panel and at the outer upper end to the underside of the floor pan.

7. A sill and rocker panel assembly for metal bodies, having in combination with a metal floor pan, an inner rocker panel secured to the under side of the floor pan, an outer rocker panel arranged to have a hook engagement with the outer edge portion of the floor pan and removably securable along its under edge to the inner rocker panel, the said floor pan having an upwardly-extending portion at the side edges to form the door sill and having on the outside of the door sill a drop portion which ends at the side with a channel, the outer edge portion of the floor pan being turned up to form a stop member to abut the removable rocker panel, upstanding angular clips welded to the floor pan in the channel and the rocker panel having a turned-in flange at the top having angular depending clips welded to said turned-in flange, the said clips of floor pan and rocker panel arranged to engage one behind the other under stress when the rocker panel is applied to the floor pan and abuts against the turned-up outer edge of the floor pan, the said rocker panel having a flange at its lower edge which is removably bolted to the turned-in flange of the inner rocker panel and a weatherstrip retaining channel fastened to the outside of the drop portion of said floor pan.

HAROLD L. GOODWIN.
KENNETH E. COPPOCK.

REFERENCES CITED

The following references are of record in the file of this patent:

UNITED STATES PATENTS

| Number | Name | Date |
|---|---|---|
| 1,834,527 | Ledwinka | Dec. 1, 1931 |
| 2,012,057 | Swallow | Aug. 20, 1935 |
| 2,093,608 | Kelley et al. | Sept. 21, 1937 |
| 2,114,344 | Haberstump | Apr. 19, 1938 |
| 2,188,267 | Ledwinka et al. | Jan. 23, 1940 |
| 2,306,416 | Waterhouse, Jr. | Dec. 29, 1942 |